United States Patent [19]

Christy et al.

[11] Patent Number: 4,664,509

[45] Date of Patent: May 12, 1987

[54] DUAL MODE DOCUMENT HANDLING APPARATUS

[75] Inventors: Kenneth G. Christy, Webster; Thomas F. Cooper, Rochester, both of N.Y.

[73] Assignee: Xerox Corporation, Stamford, Conn.

[21] Appl. No.: 856,894

[22] Filed: Apr. 28, 1986

[51] Int. Cl.[4] ............................................. G03B 27/62
[52] U.S. Cl. .......................................... 355/75; 271/3
[58] Field of Search ............................... 355/75; 271/3

[56] References Cited

U.S. PATENT DOCUMENTS

| Re. 31,891 | 5/1985 | Tickner et al. | 355/75 |
|---|---|---|---|
| 3,964,739 | 6/1976 | Garcia | 271/3 |
| 3,997,093 | 12/1976 | Aizawa et al. | 226/11 |
| 4,010,882 | 3/1977 | Turner | 226/11 |
| 4,087,172 | 5/1978 | Van Dongen | 355/14 |
| 4,191,467 | 3/1980 | Schieck | 355/75 |
| 4,284,222 | 8/1981 | Hank | 226/181 |
| 4,300,710 | 11/1981 | DuBois et al. | 226/74 |
| 4,320,960 | 3/1982 | Ward et al. | 355/14 R |
| 4,334,764 | 6/1982 | Rawson et al. | 355/75 |
| 4,462,527 | 7/1984 | Taylor et al. | 226/15 |
| 4,486,093 | 12/1984 | McNew | 355/75 |
| 4,526,309 | 7/1985 | Taylor et al. | 226/33 |

OTHER PUBLICATIONS

IBM. Disclosure Bulletin, vol. 18, No. 11, p. 3537, Author: Rachui, Published Apr., 1976.
IBM Disclosure Bulletin, vol. 19, No. 1, p. 248, Author: Richards et al. Published Jun., 1976.

*Primary Examiner*—Monroe H. Hayes
*Attorney, Agent, or Firm*—H. Fleischer; J. E. Beck; R. Zibelli

[57] ABSTRACT

A dual mode document handling apparatus in which either individual cut sheet documents or computer-form web documents are advanced to an exposure station of a reproducing machine. Successive cut sheet documents are advanced in a first direction to the exposure station. Successive incremental lengths of a computer form web document are moved to the exposure station in a second direction substantially normal to the first direction. The machine operator may select either computer-form web document feeding or cut sheet document feeding.

15 Claims, 5 Drawing Figures

DUAL MODE DOCUMENT HANDLING APPARATUS

This invention relates generally to an electrophotographic printing machine, and more particularly concerns a dual mode document handling apparatus in which either individual cut sheet documents or computer form web documents are advanced to an exposure station of the printing machine.

Generally, the process of electrophotographic printing includes charging a photoconductive member to a substantially uniform potential so as to sensitize the surface thereof. The charged portion of the photoconductive surface is exposed to a light image of an original document being reproduced. This records an electrostatic latent image on the photoconductive member corresponding to the informational areas contained in the original document. After the electrostatic latent image is recorded on the photoconductive member, the latent image is developed by bringing a developer mixture into contact therewith. This forms a powder image on the photoconductive member which is subsequently transferred to a copy sheet. Finally, the powder image is heated to permanently affix it to the copy sheet in image configuration.

In high speed electrophotographic printing machines, successive original documents may be rapidly advanced to the exposure station. This may be achieved through the automatic handling of original documents being copied. It is desirable to feed, register and copy document sheets of a wide variety of sizes, types, weights, materials, etc. without damage or wear. Hereinbefore, individual cut sheet documents have been advanced to the platen of the exposure station by recirculating document handlers. Exemplary recirculating document handlers are described in U.S. Pat. No. 4,335,954 issued to Phelps, on June 22, 1982; U.S. Pat. No. 4,278,344 issued to Sahay, on July 14, 1981; U.S. Pat. No. 4,270,746 issued to Hamlin, on June 2, 1981; and U.S. Pat. No. 4,076,408 issued to Reid et al., on Feb. 28, 1978. However, recirculating document handling units of the foregoing type can not readily feed computer form web documents to the platen of the exposure station for reproduction on the electrophotographic printing machine. In addition to being capable of reproducing cut sheet of original documents, high speed electrostatographic printing machines should be capable of automatically reproducing computer form web documents, i.e. computer fanfold documents. Preferably, the document handling system employed in the printing machine should be capable of handling both computer fanfold documents and individual cut sheet documents. Thus, the machine operator should merely have to select the type of original document being reproduced with the document handler unit being capable of handling any type of document automatically. It is known to use an electrophotographic printing machine as a dual function machine for copying continuous length documents such as computer fanfold webs or individual cut sheet documents. For example, U.S. Pat. No. 3,446,554 issued to Hitchcock et al., on May 27, 1969 discloses an apparatus for advancing computer fanfold webs across the platen of an electrophotographic printing machine. A tractor drive engages the perforations on the side edges of the computer fanfold web to advance it across the platen for reproduction by the printing machine. Similarly, U.S. Pat. No. 3,804,514 issued to Jasinski on Apr. 16, 1974 describes a tractor feed system located after the downstream edge of the platen for advancing a computer fanfold web across the platen for reproduction in the printing machine. Various other types of document handling units capable of feeding computer fanfold web documents onto the platen of an electrophotographic printing machine for reproduction thereby have been employed. The following disclosures appear to be relevant: U.S. Pat. No. 3,964,739, Patentee: Garcia, Issued: June 22, 1976; U.S. Pat. No. 3,997,093, Patentee: Aizawa et al., Issued: Dec. 14, 1976; U.S. Pat. No. 4,010,882, Patentee: Turner, Issued: Mar. 8, 1977; U.S. Pat. No. 4,087,172, Patentee: Van Dongen, Issued May 2, 1978; U.S. Pat. No. 4,284,222, Patentee: Hank, Issued: Aug. 18, 1981; U.S. Pat. No. 4,300,710, Patentee: Du Bois et al., Issued: Nov. 17, 1981; U.S. Pat. No. 4,320,960, Patentee: Ward et al., Issued; Mar. 23, 1982; U.S. Pat. No. 4,462,527, Patentee: Taylor et al., Issued: July 31, 1984; U.S. Pat. No. Re. 31,891, Patentee: Tickner et al., Issued: May 21, 1985; U.S. Pat. No. 4,526,309, Patentee: Taylor et al., Issued: July 1, 1985; IBM Technical Disclosure Bulletin, Vol. 18, No. 11, Page 3537, Author: Rachui, Published: April, 1976; IBM Technical Disclosure Bulletin, Vol. 19, No. 1, Page 248, Author: Richards et al., Published: June, 1976.

The relevant portions of the foregoing disclosures may be briefly summarized as follows:

Garcia discloses a self aligning and self leveling pinch roll for a magnetic card transport system having a shaft extending through a pinch roll with each end thereof being located in an elongated cavity in legs. A coil spring is positioned in each cavity with one end thereof resting on a flap and the other end thereof being positioned in a counter bore.

Aizawa et al., Turner, and Du Bois all teach automatic computer form feeders wherein the documents feed along a line running from the front to the back of the copier.

Van Dongen and Tickner et al. show an automatic computer form feed in which the documents feed along a line running from left to right on the copier. The document feed is along a line parallel to the line of optical scan.

Hank discloses a pressing roller for use in sheet advancing arrangements wherein the pressing roller is supported on a shaft. A plurality of springs are biased on the shaft.

Ward et al. discloses a tractor drive system for advancing computer fanfold documents across the platen of the exposure station of an electrophotographic printing machine. The automatic handling device for the web of computer fanfold sheets is positioned adjacent one edge of the platen.

Taylor et al. U.S. Pat. No. 4,462,527 and Taylor et al. U.S. Pat. No. 4,526,309 disclose document handling systems employing friction feeders for advancing computer fanfold webs across the platen of an electrophotographic printing machine.

Rachui and Richards et al. describe drive rollers wherein a pair of rollers are spring loaded into engagement with each other to drive paper or like materials.

In accordance with one aspect of the features of the present invention, there is provided a dual mode document handling apparatus for advancing either individual cut sheet documents or computer form web documents to an exposure station of a reproducing machine. Means are provided for advancing, in a first direction, successive cut sheet documents to the exposure station. Means move, in a second direction substantially normal to the first direction, successive incremental lengths of a computer form web document to the exposure station. Operator actuatable means select either the moving means or the advancing means to feed either sheet documents or incremental lengths of the web document to the exposure station.

Pursuant to another aspect of the present invention, there is provided a method of advancing either individual cut sheet documents or computer form web documents to a an exposure station of a reproducing machine. Successive cut sheet documents are advanced, in a first direction, to the exposure station. Successive incremental lengths of computer form web document are moved, in a second direction substantially normal to the first direction, to the exposure station. The step of moving successive incremental lengths of the computer form document web document or the step of advancing the cut sheet document is selected to either feed cut sheet documents or incremental lengths of a web document to the exposure station.

Still another aspect of the features of the present invention is an electrophotographic printing machine of the type having a generally planar, substantially transparent platen at an imaging station for receiving either individual cut sheet documents or computer form web documents for copying thereat. Means advance, in a first direction, successive cut sheet documents to the platen of the imaging station. Means are provided for moving, in a second direction substantially normal to the first direction, successive incremental lengths of a computer form web document to the platen of the imaging station. Operator actuatable means select the moving means or the advancing means to feed either sheet documents or incremental lengths of a web document to the platen of the imaging station.

Other features of the present invention will become apparent as the following description proceeds and upon reference to the drawings in which.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
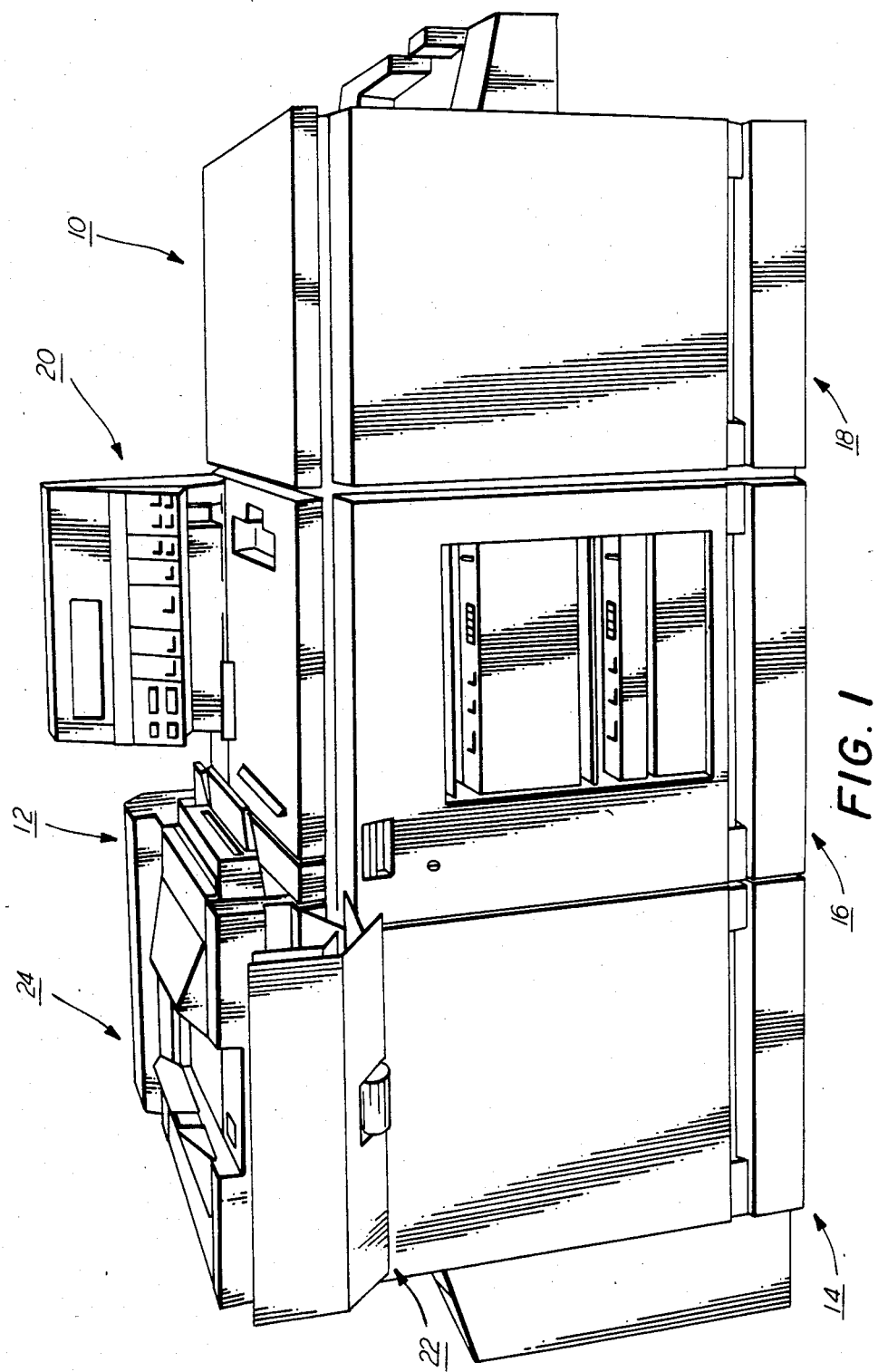
FIG. 1 is a perspective view illustrating an electrophotographic printing machine incorporating the document handling system of the present invention therein.

For a general understanding of the features of the present invention, reference is made to the drawings. In the drawings, like reference numerals have been used throughout to designate identical elements. FIG. 1 is a perspective view illustrating an exemplary electrophotographic printing machine incorporating the features of the present invention therein. It will become apparent from the following discussion that the apparatus of the present invention is equally well suited for use in a wide variety of printing machines and is not necessarily limited in its application to the particular embodiment shown herein.

Turning now to FIG. 1, there is shown a perspective view of the exemplary electrophotographic printing machine incorporating the features of the present invention therein. As shown thereat, printing machine 10 includes a document handling unit, indicated generally by the reference numeral 12, for advancing either individual cut sheet documents or computer form web documents onto the platen of the exposure station of the printing machine. The platen of the printing machine is located at the exposure station of the processing module 14. Copy sheets are advanced from the copy sheet module 16 to the processing module 14. The resultant copies are then transported to the finishing module 18 where sets of copies are compiled and stapled together. Control panel 20 enables the machine operator to select the mode of operation in which the printing machine operates. Thus, the machine operator may actuate one button which energizes the computer form web document feeder, indicated generally by the reference numeral 22, of document handling unit 12 to advance incremental lengths of computer form web documents to the platen of the exposure station. Alternatively, the machine operator may activate another button which energizes the recirculating handling document unit 24 of document handling unit 12 to advance successive individual cut sheet documents onto the platen of the exposure station.

Inasmuch as the art of electrophotographic printing is well known, the various processing stations employed in processing module 14 and their relationship with document handling unit 12 will be shown hereinafter schematically and their operation described briefly with reference to FIG. 2.

Figure 2:
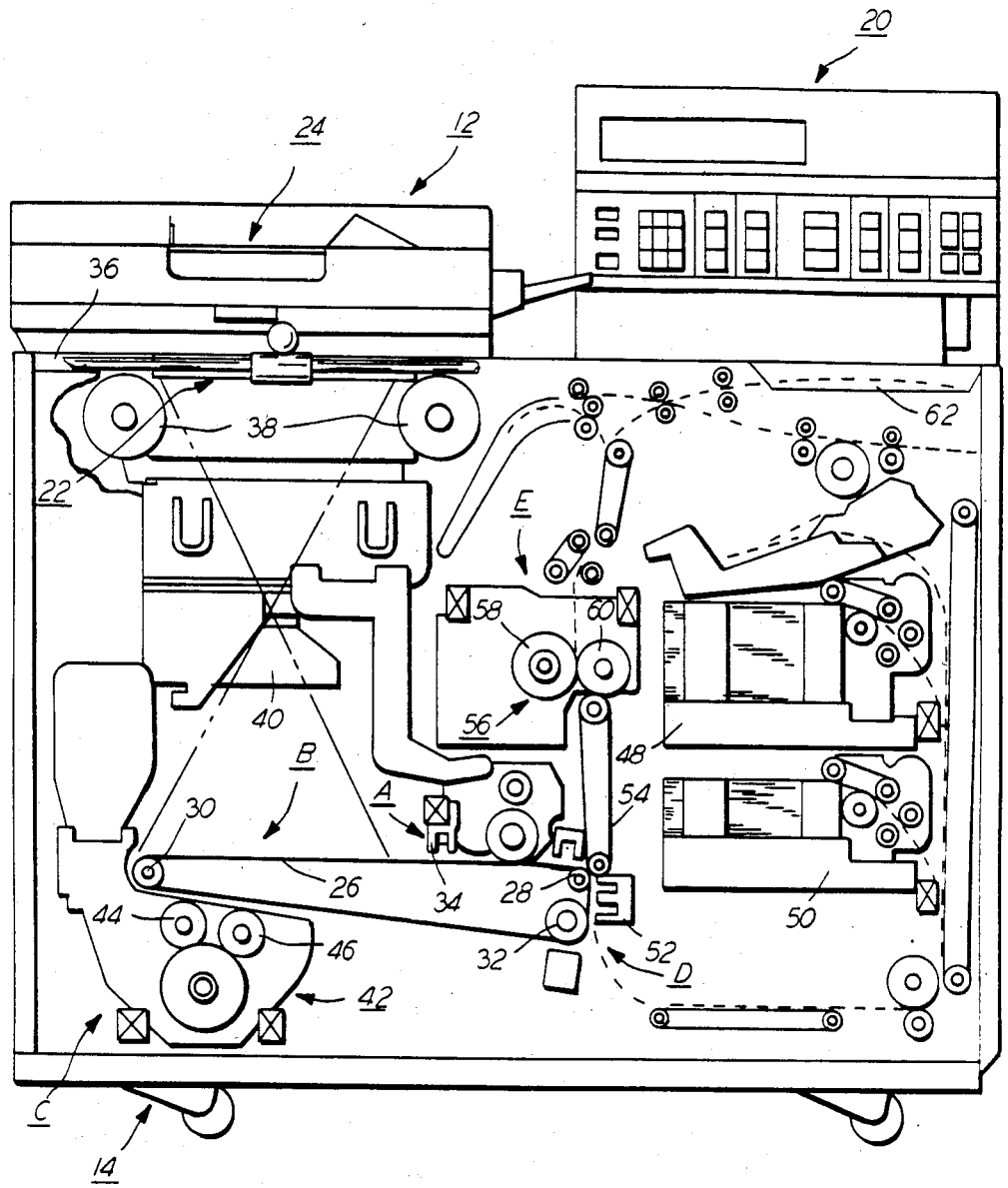
FIG. 2 is a schematic, elevational view of the processing stations of the FIG. 1 printing machine having the features of the present invention incorporated therein.

Referring now to FIG. 2, processing module 14 includes a belt 26 having a photoconductive surface deposited on a conductive substrate. Preferably, the photoconductive surface is made from a selenium alloy with the conductive substrate being preferably made from an aluminum alloy which is electrically grounded. Belt 26 advances successive portions of the photoconductive surface sequentially through the various processing stations disposed about the path of movement thereof. Belt 26 is entrained about stripping roller 28, tensioning roller 30 and drive roller 32. Drive roller 32 is coupled to a suitable motor so as to rotate and advance belt 26.

Initially, a portion of belt 26 passes through charging station A. At charging station A, a corona generating device 34 charges the photoconductive surface of belt 26 to a relatively high, substantially uniform potential.

After the photoconductive surface of belt 26 is charged, the charged portion thereof is advanced through exposure station B. At exposure station B, either individual cut sheet documents or computer form web documents are advanced by document handling unit 12 to transparent platen 36. Lamps 38 flash light rays onto the document. The light rays reflected from the document are transmitted through lens 40 forming a alight image thereof. Lens 40 focuses the light image onto the charged portion of the photoconductive surface selectively dissipating the charge thereon. This records an electrostatic latent image on the photoconductive surface which corresponds to the informational areas contained within the original document. In operation, the machine operator selects either the computer form web feeder or the individual cut sheet feeder button on control panel 20. This activates either the computer form web document feeder 22 of document handling unit 12 or the recirculating document handling unit 24 of document handling unit 12 to advance the document to platen 36 of exposure station or imaging station B. Further details of document handling unit 12 will be described hereinafter with reference to FIGS. 3 through 5, inclusive.

With continued reference to FIG. 2, after the electrostatic latent image has been recorded on the photoconductive surface of belt 26, belt 26 advances the latent image to development station C. At development station C, a magnetic brush development system, indicated generally by the reference numeral 42, advances developer material into contact with the latent image. Preferably, magnetic brush development system 42 includes two magnetic brush developer rollers 44 and 46. Each roller advances developer material into contact with the latent image. These rollers form a brush of carrier granules and toner particles extending outwardly therefrom. The latent image attracts the toner particles from the carrier granules forming a toner powder image on the latent image.

After the electrostatic latent image is developed with toner particles, belt 26 advances the toner powder image to transfer station D. A sheet of support material advances to transfer station D from copy sheet trays 48 and 50. Transfer station D includes a corona generating device 52 which sprays ions onto the backside of the copy sheet. This attracts the toner toner powder image from the photoconductive surface to the copy sheet. After transfer, the copy sheet moves onto conveyor 54 which advances the sheet to fusing station E.

Fusing station E includes a fuser assembly, indicated generally by the reference numeral 56 which permanently affixes the transferred powder image to the copy sheet. Preferably, fuser assembly 56 comprises a heated fuser roll 58 and a back-up roller 60. The copy sheet passes between the fuser roller and back-up roller with the toner powder image contacting the fuser roller. In this manner, the toner powder image is permanently affixed to the copy sheet. After fusing, the copy sheet is either advanced to output tray 62 or, returned to duplex tray 64 for subsequent recycling so as to enable the toner powder iamge to be transferred to the other side thereof.

Figure 3:
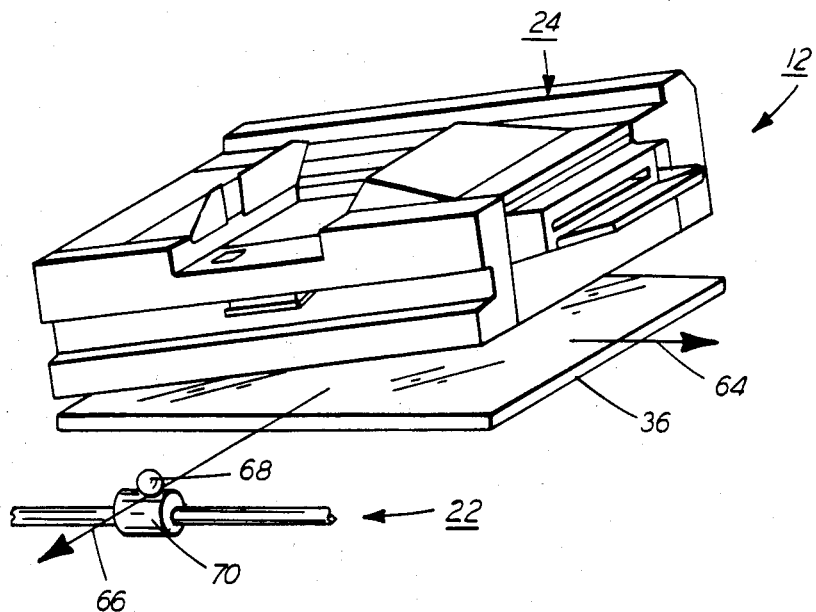
FIG. 3 is a schematic perspective view showing the document handling unit employed in the FIG. 2 printing machine.

Turning now to FIG. 3, there is shown document handling unit 12 in greater detail. As depicted thereat, the recirculating document handling unit 24 advances successive individual cut sheet documents, in the direction of arrow 64, onto platen 36. After being exposed, the individual cut sheet documents are either returned to the storage tray of recirculating document handling 24 or advanced to an output tray for subsequent removal from the printing machine by the operator. In either case, the individual cut sheet document move in the direction of arrow 64 across platen 36. A suitable recirculating document handling unit is disclosed in U.S. Pat. No. 4,310,236 issued to Connin, in 1982, the relevant portions thereof being hereby incorporated into the present application. However, one skilled in the art will appreciate that any type of suitable recirculating document handling unit may be employed. Other suitable recirculating document handling units are described in U.S. Pat. Nos. 4,335,954, 4,278,344, 4,270,746, and 4,076,408. In the event that computer form web documents are being copied by the printing machine, the lead edge of the computer form web document is initially manually positioned between ball 86 and drive roll 70 of computer form web document feeder 22. As drive roll 70 rotates, incremental lengths, corresponding to the size of one original document, are successively advanced in the direction of arrow 66, onto platen 36. After each incremental length of the computer form web document is exposed, the next successive incremental length of the computer form web document is advanced automatically onto the platen. It is evident that the computer form web document advances across platen 36 in the direction of arrow 66 whereas individual cut sheet documents advance across platen 36 in the direction of arrow 64. Thus, the direction of movement of the computer form web document is substantially perpendicular to the direction of movement of the individual cut sheet documents. The computer form web document is guided by a registration edge and movable side guides (not shown). Roller 70 is driven by a D.C. motor with a disk and optical sensor located thereon to count pulses. In addition, a sensor is positioned to count the number of holes in the computer form web document as the sheets pass across platen 36. In this way, the number of holes counted is compared with the rotation of roller 70 so as to appropriately de-energize the DC motor driving roller 70 after the requisite incremental length of computer form web document has been positioned on platen 36 for successive exposures thereon. Hence, the computer form web document 22 is a friction drive system. This is achieved by having the computer form web document pass into the nip defined by roller 70 and ball 68. Ball 68 is resiliently urged into contact with roller 70 to define the nip through which the computer form web document passes as it is advanced in the direction of arrow 66.

Figure 4:
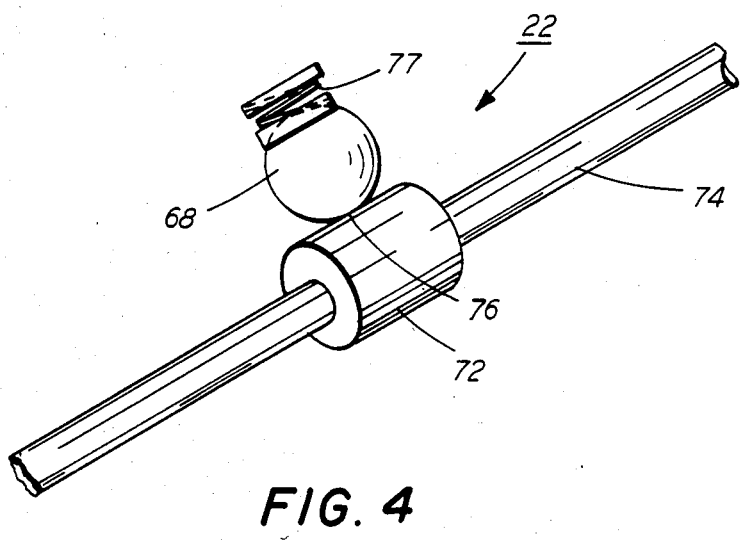
FIG. 4 is a schematic, perspective view illustrating the computer form web document feeder of the document handling system.

Referring now to FIG. 4, further details of computer form web document 22 are described thereat. Computer form web document feeder 22 includes a drive roller 70 which comprises a cylindrical tube 72 mounted on a shaft 74 to rotate in unison therewith. Preferably, cylindrical tube 72 is made from a resilient material, such as rubber. Shaft 74 is coupled to the D. C. drive motor. Ball 68 is resiliently urged into contact with cylindrical tube 72 by coil spring 76. This defines a nip 76 through which the computer form web document passes. Actuation of the D. C. motor rotates shaft 74, and in turn, cylindrical tube 72. This causes successive incremental lengths of the computer form web document to advance through nip 76. In this way, the computer form web document is frictionally driven across platen 36. The computer form web document feeder 22 is positioned downstream of the edge of platen 36. This is shown more clearly with reference to FIG. 5.

Figure 5:
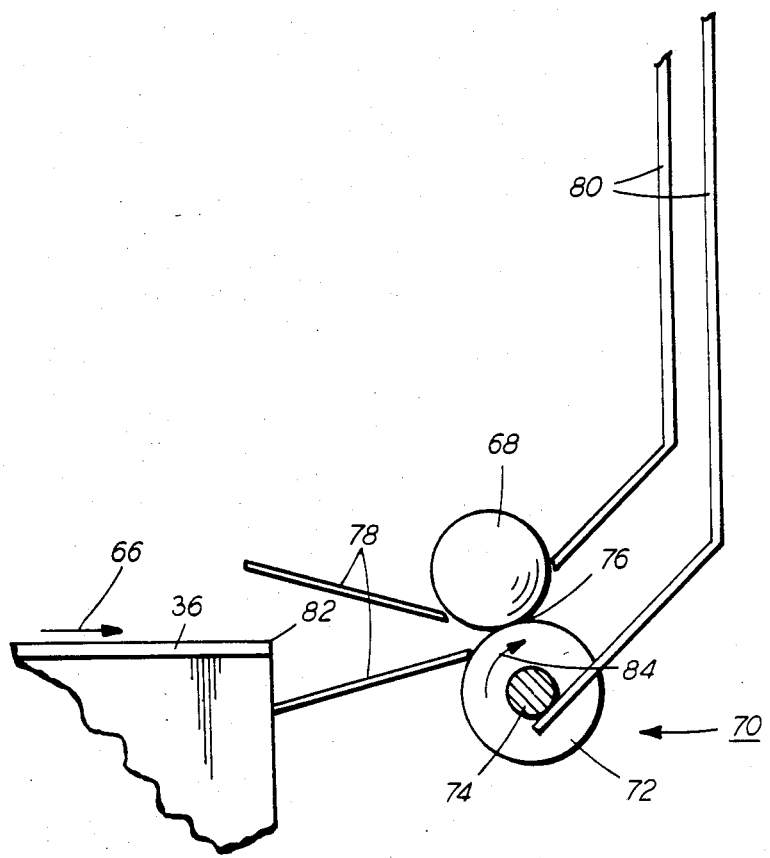
FIG. 5 is a elevational view showing the FIG. 4 computer form web document feeder of the document handling system.

Turning now to FIG. 5, computer form web document feeder 22 is positioned downstream of edge 82 of platen 36. The computer form web document is advanced in the direction of arrow 66. Guides 78 insure that the computer form web document moves easily through nip 76 defined by ball 68 and cylindrical tube 72 of drive roll 70. As shaft 74 rotates in the direction of arrow 84, cylindrical tube 72 rotates in unison therewith to advance the computer form web document through nip 76 and across platen 36 in the direction of arrow 66. The computer form web document moves between guides 78 through nip 76 into the bin defined by guides 80. In this way, successive incremental lengths of a computer form web document are frictionally fed across platen 36 in the direction of arrow 66 so as to be exposed thereat. Preferably, platen 36 is a stationary, substantially planar, transparent member adapted to receive documents thereon.

In recapitulation, it is clear that the dual mode document handling unit of the present invention advances either individual cut sheet documents or incremental lengths of computer form web documents to the platen of an exposure station of an electrophotographic printing machine. The individual cut sheet documents are advanced in a first direction with the incremental lengths of the computer form web document being advanced in a second direction. The direction of movement of the individual cut sheet document is substantially perpendicular to the direction of movement of the computer form web document. The computer form web document feeder is a friction drive system which is simple, relatively inexpensive and highly reliable.

It is, therefore, apparent that there has been provided in a accordance with the present invention, an apparatus for advancing either individual cut sheet document or computer form web documents to an exposure station of a reproducing machine that fully satisfies the aims and advantages hereinbefore set forth. While this invention has been described in conjunction with a specific embodiment thereof, it is is evident that many alternatives, modifications and variations will be apparent to those skilled in the art. Accordingly, it is intended to embrace all such alternatives, modifications, and variations as fall within the spirit and broad scope of the appended claims.

We claim:

1. A dual mode document handling apparatus for advancing either individual cut sheet documents or computer form web documents to an exposure station of a reproducing machine, including:
   means for advancing, in a first direction, successive cut sheet documents to the exposure station;
   means for moving, in a second direction substantially normal to the first direction, successive incremental lengths of a computer form web document to the exposure station; and
   operator actuatable means for selecting either said moving means of said advancing means to feed either cut sheet documents or incremental lengths of a web document to the exposure station.

2. A document handling apparatus according to claim 1, wherein said moving means includes friction feed means for moving successive incremental lengths of the computer form web document to the exposure station.

3. A document handling apparatus according to claim 2, wherein the exposure station includes a substantially planar, stationary, transparent platen for receiving documents thereon.

4. A document handling apparatus according to claim 3, wherein said friction feed means is positioned after the downstream edge of said platen.

5. A document handling apparatus according to claim 4, wherein said friction feed means includes:
   a roller;
   means for rotating said roller;
   a ball; and
   means for resiliently urging said ball into contact with said roller to define a nip for receiving the computer form web document so that rotation of said roller advances successive incremental lengths of the computer form web document onto the platen.

6. A document handling apparatus according to claim 5, wherein said advancing means includes a recirculating handling document unit.

7. A method of advancing either individual cut sheet documents or computer form web documents to an exposure station of a reproducing machine, including the steps of:
   advancing, in a first direction, successive cut sheet documents to the exposure station;
   moving, in a second direction substantially normal to the first direction, successive incremental lengths of a computer form web document to the exposure station; and
   selecting either said step of moving successive incremental lengths of the computer form web document of said step of advancing the cut sheet document to feed either sheet documents or incremental lengths of a web document to the exposure station.

8. A method according to claim 7, wherein said step of moving includes the step of moving frictinally successive incremental lengths of the computer form web document to the exposure station.

9. A method according to claim 8, further including the step of receiving the sheet document or incremental length of computer form web document on a substantially planar, stationary, transparent platen.

10. A method according to claim 9, wherein said step of moving frictionally includes the steps of:
    resiliently urging a ball, positioned after the downstream edge of the platen, into contact with a roller to define a nip for receiving the computer form web document; and
    rotating the roller to advance successive incremental lengths of the the computer form web document onto the platen.

11. An electrophotographic printing machine of the type having a generally planar, substantially transparent platen at an imaging station for receiving either individual cut sheet documents or computer form web documents for copying thereat, including:
    means for advancing, in a first direction, successive cut sheet documents to the platen of the imaging station;
    means for moving, in a second direction substantially normal to the first direction, successive incremental lengths of a computer form web document to the platen of the imaging station; and
    operator actuatable means for selecting either said moving means or said advancing means to feed either cut sheet documents or incremental lengths of a web document to the platen on the imaging station.

12. A printing machine according to claim 11, wherein said moving means includes friction feed means for moving successive incremental lengths of the computer form web document to the platen of the imaging station.

13. A printing machine according to claim 12, wherein said friction feed means is positioned after the downstream edge of the platen.

14. A printing machine according to claim 13, wherein said friction feed means includes:
    a roller;
    means for rotating said roller;
    a ball; and
    means for resiliently urging said ball into contact with said roller to define a nip for receiving the computer form web document so that rotation of said roller advances successive incremental lengths of the computer form web document onto the platen.

15. A printing machine according to claim 14, wherein said advancing means includes a recirculating handling document unit.

* * * * *